United States Patent
Shanahan et al.

(10) Patent No.: US 8,219,904 B2
(45) Date of Patent: *Jul. 10, 2012

(54) META-DOCUMENT AND METHOD OF MANAGING

(75) Inventors: James Shanahan, Meylan (FR); Gregory Grefenstette, Gieres (FR)

(73) Assignee: Xerox Corporation, Norwalk, CT (US)

( * ) Notice: Subject to any disclaimer, the term of this patent is extended or adjusted under 35 U.S.C. 154(b) by 155 days.

This patent is subject to a terminal disclaimer.

(21) Appl. No.: 12/784,840

(22) Filed: May 21, 2010

(65) Prior Publication Data

US 2010/0235337 A1    Sep. 16, 2010

(51) Int. Cl.
*G06F 17/00* (2006.01)
*G06F 7/16* (2006.01)
*G06F 15/16* (2006.01)

(52) U.S. Cl. ........ 715/255; 715/201; 715/209; 715/234; 707/654; 707/713; 707/732; 709/203; 709/217

(58) Field of Classification Search ............... 715/201, 715/204, 205, 209, 229, 231, 234, 249, 254, 715/255, 273, 700, 738, 748, 750, 751, 760; 707/609, 610, 611, 613, 614, 618, 654, 695, 707/705, 706, 713, 723, 73; 709/202, 203, 709/217, 219, 201
See application file for complete search history.

(56) References Cited

U.S. PATENT DOCUMENTS

| | | | |
|---|---|---|---|
| 5,379,423 A | 1/1995 | Mutoh et al. |
| 5,862,325 A | 1/1999 | Reed et al. |
| 5,974,441 A | 10/1999 | Rogers et al. |
| 5,999,929 A | 12/1999 | Goodman |
| 6,006,251 A | 12/1999 | Toyouchi et al. |
| 6,070,191 A | 5/2000 | Narendran et al. |
| 6,088,717 A | 7/2000 | Reed et al. |
| 6,119,101 A | 9/2000 | Peckover |
| 6,178,430 B1 | 1/2001 | Cohen et al. |
| 6,226,675 B1 | 5/2001 | Meltzer et al. |
| 6,240,429 B1 | 5/2001 | Thornton et al. |
| 6,279,006 B1 | 8/2001 | Shigemi et al. |
| 6,314,425 B1 | 11/2001 | Serbinis et al. |
| 6,493,731 B1 | 12/2002 | Jones et al. |
| 6,505,219 B1 | 1/2003 | MacLean et al. |
| 6,510,432 B1 | 1/2003 | Doyle |
| 6,567,800 B1 | 5/2003 | Barrera et al. |

(Continued)

FOREIGN PATENT DOCUMENTS

EP    1143356 A3    2/2003

(Continued)

OTHER PUBLICATIONS

Jay Budzik, Kristian Hammond, "Watson: Anticipating and Contextualizing Information Needs", In Proceedings of the Sixty-second Annual Meeting of the American Society for Information Science, 1999, retrieved on Dec. 10, 2002 from URL:http://citeseer.nj.nec.com/cache/papers/cs/10883/http:zSzzSzdent.infolab.new.eduzSzinfolabzSzdownloadszSzpaperszSzpaer10056.pdf/budzik99watson.pdf.

(Continued)

*Primary Examiner* — Maikhanh Nguyen

(57) ABSTRACT

A system includes a meta-document, i.e., a document including content information which has a set of document service requests associated with it. A document service is a process which uses a portion of the document content as a starting point to obtain other information pertaining to that content. A scheduler selects a document service request from the set, then initiates and manages managing communication with a service provider to satisfy the selected document service. Any results received from the selected document service are integrated into the document.

19 Claims, 4 Drawing Sheets

U.S. PATENT DOCUMENTS

| | | |
|---|---|---|
| 6,584,466 B1 | 6/2003 | Serbinis et al. |
| 6,772,208 B1 | 8/2004 | Dutta |
| 6,820,075 B2 | 11/2004 | Shanahan et al. |
| 6,957,429 B1 | 10/2005 | Sekijima et al. |
| 7,590,934 B2 | 9/2009 | Hubert et al. |
| 2002/0120685 A1 | 8/2002 | Srivatsava et al. |
| 2002/0165872 A1 | 11/2002 | Meltzer et al. |

FOREIGN PATENT DOCUMENTS

| | | |
|---|---|---|
| WO | WO 98/06033 | 2/1998 |

OTHER PUBLICATIONS

S. Chang et al., "Adlet: Active Document for Adaptive Information Integration", available on the Internet Jul. 2001 at http://www.cs.pitt.edu/~chang/365/adlet.html, pp. 1-20.

Dourish et al., "Extending Document Management System with User-Specific Active Properties", ACM Transactions on Information System, vol. 18, No. 2, Apr. 2000, pp. 140-170.

Dourish et al., "Using Properties for Uniform Interaction in the Presto Document System", Proceedings of the 12th Annual ACM Symposium on User Interface Software and Technology, Nov. 1999, pp. 55-64.

Dourish et al., "A Programming Model for Active Document", Proceedings of the 12th Annual ACM Symposium on User Interface Software and Technology, vol. 2, Nov. 2000, pp. 41-50.

P. Ipeirotis et al., "Probe, Count, and Classify : Categorizing Hidden-Web Databases", Proceedings of the 2001 ACM SIGMOD International Conference on Management of Data, 2001, pp. 1-12.

Martin Fredriksson, Mikael Svahnberg, "Fargo Technical Description", University College of Karlskrona/Ronneby, 1997.

Mukherjea et al., "Visualizing World-Wide Web search engine results", IEEE, Jul. 1999.

John Pozadzides, Liam Quinn, "Linking Style Sheets to HTML", Archive.org, Nov. 11, 1999, retrieved on Dec. 6, 2002 from URL:http://web.archive.org/web/19991111075232/http://htmlhelp.com/reference/css/style-html.html.

Ron Vetter, "Comparing Internet Search Engines", IEEE, Apr. 1997, pp. 117-118.

META-DOCUMENT AND METHOD OF MANAGING

This application claims priority from U.S. patent application Ser. No. 09/543,962 (now U.S. Pat. No. 7,757,168), filed Apr. 7, 2000, which is incorporated in this disclosure by reference.

FIELD OF THE INVENTION

This invention relates generally to the management and use of documents, and in particular, to the management and use of documents which act as autonomous agents, generating requests for information, then seeking, retrieving and packaging responses.

BACKGROUND OF THE INVENTION

Knowledge management through document management forms an important part of the knowledge creation and sharing lifecycle. A typical model of knowledge creation and sharing is cyclical, consisting of three main steps: synthesizing (search, gather, acquire and assimilate), sharing (present, publish/distribute), and servicing (facilitate document use for decision making, innovative creativity). Currently documents are considered static objects which only acquire new content when acted upon by an authorized user. A user's decision to read and modify a document, or to run a program on it which may change its contents (for example, by adding hyperlinks), is needed for the document to acquire new information.

This view of the document as a passive repository leads to the current situation in which most computers remain idle, documents sleeping on disks, unless a user is in front of the screen piloting the system. Instead of trying to do something useful, or trying to predict what a user would like to see associated with a document, documents just lie around doing nothing on inactive computers.

Both agent-based systems and content-based retrieval systems provide some management of information without user intervention. An agent is a software program that performs a service, such as alerting the user of something that needs to be done on a particular day, or monitoring incoming data and giving an alert when a message has arrived, or searching for information on electronic networks. An intelligent agent is enabled to make decisions about information it finds. Both such systems, however, consider documents to be fixed and static entities.

Many products provide various solutions for individual aspects of the overall problem of knowledge management: anticipatory services, unstructured information management, and visualization of information and knowledge. Watson, for example, from the InfoLab at the University of Northwestern, is a program which operates while a user is creating a document. Watson retrieves information as the user works, from which the user can select for further investigation. Information retrieved by Watson comes from a single service provider, and Watson stores the retrieved information in memory associated with Watson.

Online services such as Amazon.com offer zBubbles, which appear inside a menu bar at the top of the browser window. The zBubble travels with the user as he/she shops the Web, pointing to the best deals and products around. Netscape's "What's related service" works with the browser and accompanies the user as he/she surfs, providing useful information about the sites being viewed and suggesting related sites. Inxight's parabolic tree is an example of a system that organizes unstructured information and presents it in an intuitive format: a hyperbolic tree. All of these services treat documents as static objects.

Various products, such as commercial search engines, provide unstructured information, such as web pages, documents, emails etc. (which content may consist of text, graphics, video, or sound). Typical management services for unstructured information include: search and retrieval; navigation and browsing; content extraction, topic identification, categorization, summarization, and indexing; organizing information by automatic hyperlinking and creation of taxonomies; user profiling by tracking what a user reads, accesses, or creates create communities; etc.

SUMMARY OF THE INVENTION

A system according to the invention overcomes the disadvantages of the prior systems by treating documents as active agents in the knowledge creation and sharing lifecycle. A meta-document according to the invention is an active agent in the knowledge creation and sharing cycle and operates without user intervention, searching, collecting and adding information to the original document. Since user intervention is not required for a meta-document to add to the document's knowledge, the meta-document can operate during idle computer cycles.

A system according to the invention includes a meta-document, i.e., a document including content information, which has a set of document service requests associated with it. A document service is a process which uses a portion of the document content as a starting point to obtain other information pertaining to that content. A scheduler activates and manages the document service requests, requesting fulfillment of a selected document service from a service provider, updating status of the document service requests and integrating any results returned from a fulfilled document service.

Preferably, the set of document service requests is selected from a group of pre-packaged document service requests. If the set of document service requests is based on a theme or context, it is called a "personality." The word personality is used since applying different sets of document service requests to the same document content will provoke different results (i.e., different links and connections), just as people with different personalities will react differently to the same situation. Examples of selected personalities include TechWatch, Scientific, patent Attorney, Fiction Reader. However, many different types of personalities may be created depending on the intended theme or context.

Document service requests can be activated asynchronously, however, in many instances, some amount of time will be required to satisfy a document service request. Some document services may terminate upon completion; others may be re-activated from time to time or on a periodic basis. The scheduler can determine the schedule for activation of the document service requests. Alternatively, a user may pre-select an activation time or schedule for a document service request.

The meta-document, scheduler and service providers can reside at the same location or at different locations. In some instances, the scheduler may also reside on the meta-document itself. In this example, the scheduler must be initiated by an external service, such as when the user opens the meta-document or it may be set to initiate the meta-document periodically. In one embodiment, the scheduler resides on a meta-document server, which has write/access to all activated meta-documents. A system administrator for the server launches the scheduler and keeps it running.

The system may also include a list of available document service requests for selection by the user, in addition to a list of pre-selected personalities. The scheduler typically selects the service provider to satisfy a selected document service, however, the user may also identify preferred service providers for completion of particular document services. Alternatively, service providers can register their availability with the system for providing particular document services.

The invention turns documents from a push technology, where items of content are sent to the document in a sequence, and at a rate, determined by a user, to a pull technology, where the document requests each item individually. Rather than creating a user-centric view of a document or a document collection, the invention provides a document-centric metaphor, which we call "Document Souls" in which each document can be considered to have a "soul" such that the Document Soul seeks to create an image of the world in light of its own contents.

Static documents generally consist of content and metadata, such as size, owner creation date, etc. The meta-document of the invention extends this traditional notion of a document, along the lines of the document-centric metaphor, Document Souls, with various anthropomorphic and intelligent behaviors. These behaviors (which are provided by activation of particular document service requests) include: the ability to understand and describe its contents; the ability to communicate; the ability to learn and adapt to changing environments/situations; and the ability to assist the user with content creation. These behaviors (implemented by the set of document service requests) turn a document from a piece of static data into an intelligent document assistant with various responsibilities to its creators and to the societies of documents in which it exists. If the behaviors, i.e., the set of document service requests, associated with the document are chosen to have a common theme, then keeping the metaphor, the meta-document becomes a Document Soul with a particular personality.

DETAILED DESCRIPTION OF THE PREFERRED EMBODIMENTS

Figure 1:
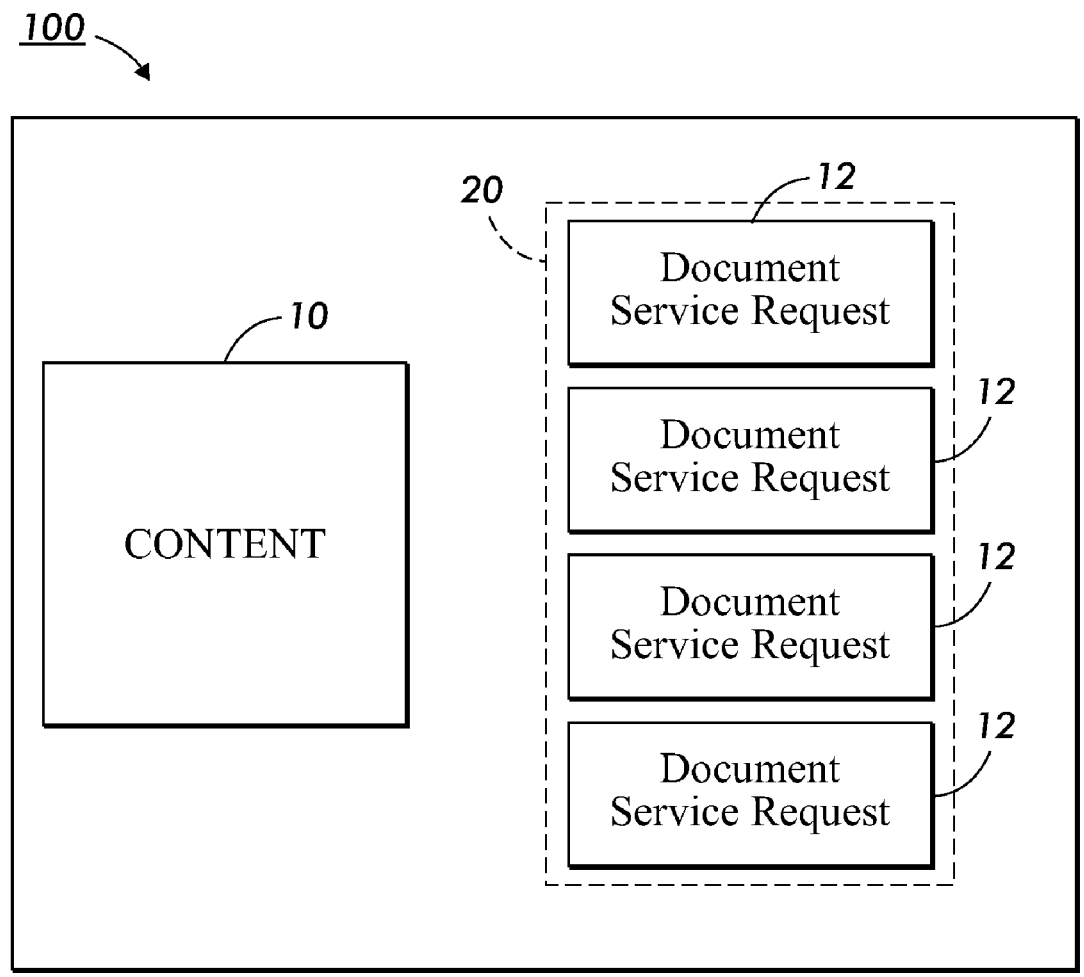
FIG. 1 is a schematic of a meta-document according to the invention.

A block diagram of a meta-document or Document Soul 100 is shown in FIG. 1. Meta-document 100 includes a content portion 10, which is a document created by a user or obtained by a user, and a set 20 of one or more document service requests 12. Within the Document Souls framework the document is seen as the result of a knowledge crystallization process—a process which lasts the lifetime of the document. Typically a document's life begins with a focus and purpose which helps direct and refine the sensing phase. The sensing phase consists of actions such as searching, gathering, assimilating and organizing information that may prove relevant to the document. These actions occur through the activation of one or more document service requests 12. Document service requests 12 may be activated while the user is creating or working on the meta-document 100 or when user has set aside the meta-document 100 so that the user can benefit from idle computer time. Activating the document service requests 12 while the user works on the document enable the Document Soul to learn about the user's preferences. Document service requests 12 may be activated by a scheduler or by the user.

The next step in cycle is concerned with sharing the information. This typically consists of formulating/refining the information gathered in the previous step in a format (that is integrating the information gathered back into the content portion 10 of the meta-document) that is useful for the user (person, community, search engine) and publishing it. The final step in the cycle deals with support whereby the meta-document performs predefined services on behalf of the user. For example, the document can keep an up-to-date map of where the document exists in terms of other documents in the world.

Figure 2:
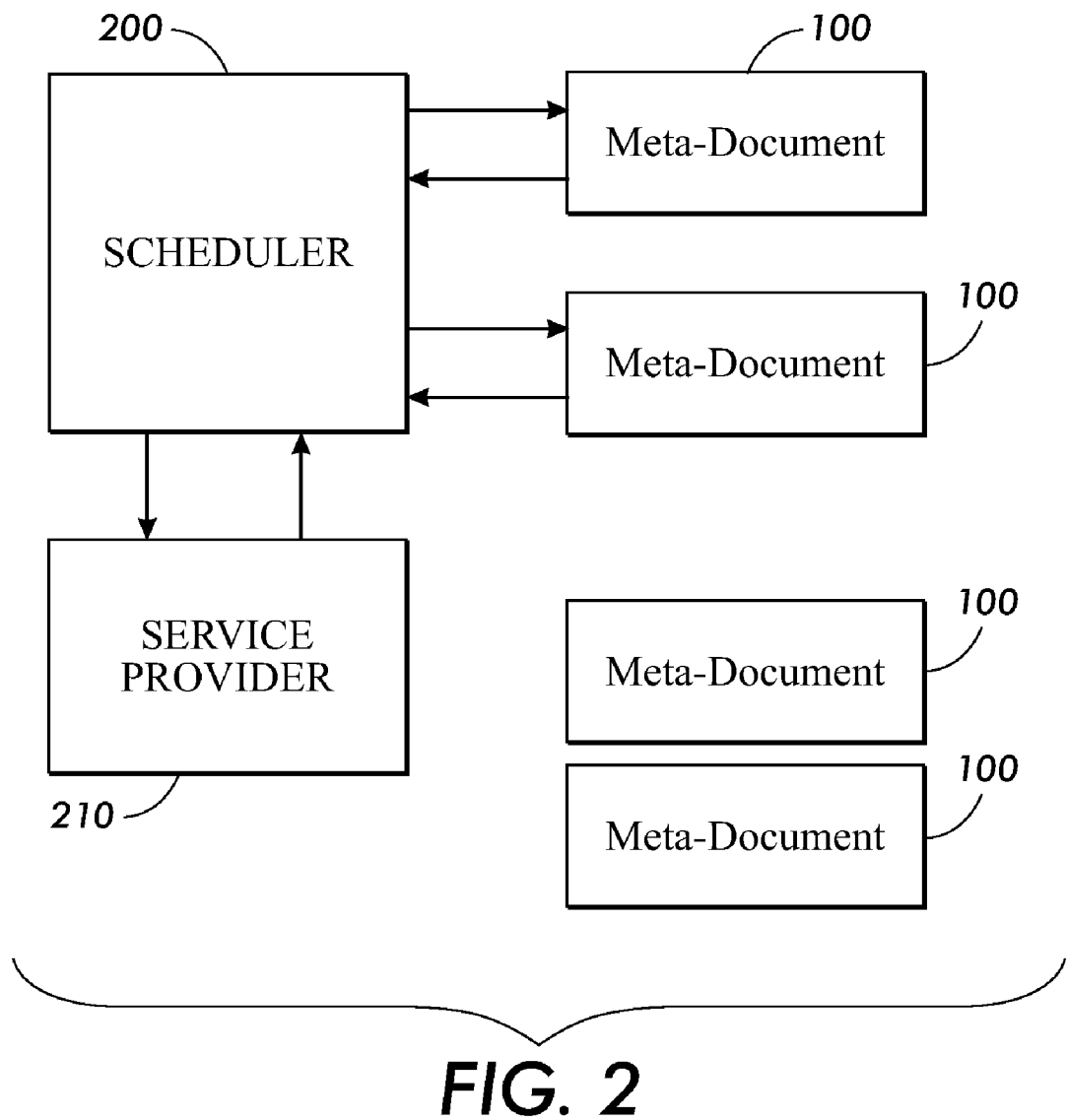
FIG. 2 is a schematic of a system according to the invention.

Referring to FIG. 2, one or more meta-documents 100 is endowed with a set of document service requests which the meta-document 100 exercises under control of a scheduler or scheduling demon 200, which wakes up the meta-document in accordance with some predetermined time schedule. The scheduler (or demon) 200 may be implemented in a software mechanism which accesses the set 20 of document service requests 12 in a meta-document 100, chooses which requests 12 to fulfill, invokes service providers 210 to satisfy those requests, and integrates the results back into the original document 10. Upon wakening, the meta-document displays its current list of document service requests 20 to the scheduler. Depending on the resources (e.g., service providers which can fulfill or satisfy a particular document service request) available to the system, the demon 200 chooses a document service request 12 to fulfill. Fulfilling a document service request means accessing a service provider 210 which runs some process (or program) that has access to the document content and environment. This process terminates by producing document-specific knowledge and possibly new document service requests 12 which are added to the meta-document 100 by scheduler 200.

Both meta-document document service requests and resulting knowledge can be represented as XML metadata added to the document at the end of each waking cycle. In one implementation, the meta-document's document service requests are expressed as XML fields: <WANT> . . . </WANT>. For example, one document service can be expressed: <WANT> who-am-i </WANT>.

In order to fulfill this document service request, the demon invokes a "who-am-i" process. This process takes the document content and its environment as input. For example, the "who-am-i" process may return the document's filename and additional document service requests to know who created the document, and where the document resides. The demon marks the initial document service as fulfilled, or deletes it from the document, and adds the additional knowledge returned by the process fulfilling the document service. In this case the following three lines are added to the initial document:

<MYNAME> xerox.txt </MYNAME>
<WANT> who-made-me </WANT>
<WANT> where-am-i </WANT>

Every waking cycle, a meta-document may acquire new metadata and new document service requests as a function of document service requests that have been fulfilled. Some document service requests may add metadata, and replicate the same document service request. Some document service requests may eliminate metadata when they are fulfilled. In general, document service requests correspond to services which add metadata to the document, based on the document's existence as a file in a file system; the content of the document as it was originally authored; and the content of the meta-data added to the document by some other process. When the document or the document's location is altered, the knowledge in the document may have to be regenerated or changed. Some knowledge, such as the relation of the contents of the document to other files in the intranet, or to documents found on the internet may have to be update periodically, possibly by some <WANT> continuous-education </WANT> document service request.

Document souls provides end-to-end solution for document-based knowledge creation and sharing. Adding a "soul" to a document lets it assist a user in the acquisition, sharing and utilization of knowledge; the document soul creates a document view of the world as opposed to a global view as in current web portals. Document souls can be created to have a personality. Each personality encodes a collection of documents services which will allow the document to act autonomously on behalf of the creator or reader, anticipating the information needs of both the writer and reader of documents, keeping the document connected and up-to-date with the rest of information world. A personality is a predetermined set of document service requests. A document, for example, may be given a personality that is inquisitive—a set of document service requests to find out more information about concepts present in the document content, find biographies of people mentioned in the content, polyglot—search out translations of the words, terms and phrases contained in the document, private—marked to keep the document's metadata invisible to other documents, scientific—search for online versions of the papers cited in the document content, or genealogical—looking for documents containing the same contents as itself.

Within the document souls framework, the document is seen as the result of a knowledge crystallization process—a process which lasts the lifetime of the document. Typically a document soul's life begins with a focus and purpose which helps direct and refine the synthesizing phase. During the synthesis phase, the document soul anticipates the information needs of the writer, either independently (through a predefined set of document service requests) or by following specific or customized instructions. The document soul performs the sometimes tedious tasks of searching, gathering, and organizing information relevant to the document content, in order to ease domain assimilation, to be suggestive, and to aid creativity/inventiveness.

The document souls system provides various services that assist the user in formulating/refining the information gathered in the previous step in a format that is useful for the reader (person, community, search engine) and to eventually publish it (to a group, to scientific indexing service etc.).

The document souls system provides various services that act on behalf of the owners and readers of documents, for example, monitoring the information web of a corporation or of the world (WWW) from a document perspective, thereby keeping the reader conscious of the current state of play (up-to-date). This can be seen as means of aiding various processes: assimilating the document, trigger innovation, decision-making etc. Furthermore this could be used as a means of attracting interest in a document, whereby the document promotes itself. Documents living within the document souls system may exploit available computer cycles, network bandwidth and internet-based resources in order to anticipate and satisfy user needs.

The document service requests may be attached to a document as metadata. Various standards for attaching metadata exist, for example, DOM (Document Object Model) and XML (extended markup language) may be used. The document souls scheduler polls the meta-documents, for each meta-document, decodes the encoding, recognizing document service requests, chooses a request to service using a parameterizable choice procedure, initiates communication with a (possible third-party) service provider that will honor this request, marshals and pass parameters to this service provider, receives output from this service provider, and integrates the service output into the meta-document as metadata. Other functions can be included in the document souls system: a coordination system to orchestrate the concurrent execution of the functions described for the scheduler, a visualization and interaction system that allows various levels of display and interaction of metadata-enhanced documents and a learning system that learns by observing the user interactions.

Some document service requests may take a long time (for example, finding all the company names mentioned on a page and accessing all WWW pages mentioning two of those companies together). Other document services may be periodically satisfiable (for example, finding the closing price of a stock). Other document services may return metadata and additional document service requests. The document services generated by successive requests further defines the document soul.

A meta-document has access to a limited amount of unused bandwidth currently wasted on machines. Instead of just sitting idly in a folder somewhere, a meta-document, following a path laid down by its personality (set of document service requests), when activated by a scheduler which communicates with a service provider to satisfy the document service, accesses the local file system, database, or the Internet to create new connections between its contents and its environment.

Meta-documents grow in size as metadata and new contents are generated and new connections are made. Storage space is becoming a negligible commodity. According to current developments a terabyte of storage will only cost $120 in ten years, enough space to hold the entire text contained in the American Library of Congress. Meta-documents may also use unused processor time. It is estimated that in 1999, the hundreds of millions of computers existing in the world are active only 10% of the time. Similarly, bandwidth across the Internet is being driven up by desire to transmit images and video in real time. Most meta-documents will be concerned with moving text around the web, requiring a small fraction of the space being created to house images.

Example. Turning a Third Party Document into a Meta-Document

It is 5 o'clock. A user has just received a document via email from a colleague about a new company. The user takes a quick glance at it. Since the user has not heard of this company and does not recognize the names of any of the officers, the user clicks on the document and drags it into a document soul "TechWatch Personality" icon on computer screen, turns off the light, and leaves the office for the night.

Meanwhile, the received document has become endowed with a TechWatch personality becoming a meta-document. It starts to find out the information the user might want about this company. The user's meta-document becomes active by associating a TechWatch personality to it, it has thus acquired a set of unsatisfied document service requests defined in this personality. A scheduler begins polling this meta-document, and choosing from the list of unsatisfied document requests. One request is to identify all the company names, the products, and the people mentioned in this document. This request is sent off to some document service provider, such as a form of Inxight's ThingFinder. When the request is satisfied, the document analyzer places XML markings around the identified items, and makes up types lists of people, products, and organizations. Another subsequent document request uses this metadata to search the web for home pages of the mentioned companies. This request returns URL's to these companies' web pages, which are also stored as metadata or as new document content (as a footnote or reference).

Using these URLs, another service provider implements another document service request and finds organizational charts for these companies on the Web, another service provider responding to a different document service request looks for recent stock prices of each company. Another service provider responding to a different document service request searches for job openings in each company. Another service provider responding to a different document service request finds press releases, issued by one of the companies, which mention another of the companies. Another service provider responding to a different document service request begins search patent databases for patents owned by each company. Another service provider responding to a different document service request looks for the company's competitors.

Other document service requests explore connections between the named people; services are spawned to find their home pages, patents they have published, CVs, press releases in which they are mentioned. Another service takes pairs of names and searches for Web sites in which both people are mentioned. Similar services are contacted to provide information about products identified in the page.

The next morning, when the user comes back to the office, he opens the meta-document and all the services that have responded have created new links in his document, new graphics items such as graphs or images, etc. Clicking on an item gives the user a list of the information that the meta-document has found out about itself overnight. The user's work has been prepared by the meta-document itself. Tomorrow, new information might be found, if the user decides that the meta-document should remain active.

Personalities. Personalities, i.e., pre-defined collections of document service requests provide a convenient shortcut in the knowledge management cycle. The word Personality is used, as noted above, since applying different sets to the same content will provoke different types of links and connections, just as people with different personalities will react differently to the same situation.

An end-user reads or writes a document. The user selects all or part of the document using conventional selection means. (Alternatively, the entire document can always be pre-selected.) To the selected part of the document, the user applies a personality, i.e., a package of pre-selected document service requests. In order to assign the personality, the user selects the personality using a conventional selection mechanism such as a pull-down menu, a pop-up table, in which personalities are listed, or represented by distinguishable icons. When the personalities are presented to the user for choice, in a preferred embodiment of the invention, the end-user can choose to see what document service request are included in the personality package. The user, upon display of the document service requests, may inactive unwanted service requests, or activate inactivated requests. The user may also click on a representation of the document service request in order to see which document service providers can fulfill the document service request. In a preferred implementation of the invention, one of the document service providers will be designated as the default provider. The choice of default can be over-ridden by the user by selecting an alternative document service provider.

Alternatively the user may enter the document using a scanning device and a cover sheet which describes what personality is to be applied to the document.

Once a personality (or personalities if more than one personality is selected) is assigned, the document soul coordinator/scheduler is notified (by the process managing the selection process) that the document has been given a personality. From that moment, the document soul coordinator/scheduler begins to periodically poll the document. During each polling, unsatisfied document service requests, associated with the document by choosing the personality, are recognized by the document soul coordinator/scheduler. The document soul coordinator/scheduler chooses a document service request to fulfill, and finds the default or user-selected document service that fulfills this service for this user. The document soul coordinator/scheduler then initiates communication with a selected document service provider, marshaling the data from the document needed to provide the service and sending this data to the document service provider using known data transfer protocol methods.

When the document service provider fulfills the service request, the service provider informs the document soul coordinator/scheduler, passing along any results associated with the service request as data using standard data protocol transfer mechanisms. Examples of the data that a document service may provide include the following, though any practitioner skilled in the art of data transfer and packaging can easily imagine others:

1) the service provider might return a URL to a results page that the service provider has created;

2) the service provider might return an XML or HTML page generated with the service results inside the marked-up page;

3) the service provider might return some portion of the original document content with new HTML links surrounding some of the information in the original contents;

4) in addition to what it returned in (3) the service provider might return a series of XML or HTML pages that the new links inserted point to;

5) the service provider might provide offsets into the original document contents, and related information pertinent to the original contents found in those offsets, such as hypertext to be inserted them, or images, or new text, etc.

The document soul coordinator/scheduler manages the information returned from the service provider and associates the results with the original text providing a new view of the document, according to the service request. In a preferred implementation of the invention, each service request provides at least one new view on the original document content, in which a view could be simply a new version of the document with different hypertext links inserted, or a rewriting of the original document.

The user is able to access any of the document service-specific views of the document to which the user has attached a personality at any time. This access can be through conventional computer-based visualization means such as browsers, or by displaying requested views on a conventional marking engine. If the document service request is not yet satisfied, then the user is informed of the status.

The user may also create a new personality by visualizing a list of all available document services, and by selecting, using conventional means, such as clicking a check-box, the document service requests that will form the new personality. Once the choices have been made, including the specific service providers to be associated with each document service request, the end-user supplies a name for the new personality, making the personality available for the user, or for any other user to which the original end-user grants access rights, to be applied to another document.

A third-party document service provider may be granted permission by the documents souls coordinator/scheduler to propose itself as a new document service provider for a new or for an existing service. In the first case, the third-party document service provider follows a registration protocol, such as accessing an Internet site to fill a form that describes what service will be performed, what input the service needs from the documents souls coordinator/scheduler in order to be invoked, and what data transfer protocol is to be used. The protocol may include known transaction mechanisms for paying for the service. In the latter case of a document service provider providing an existing service, the third-party document service provider will be given access to the already established data transmission protocol, and be registered as a possible new service provider for the existing service.

Sample Personalities. A large variety of personalities may be defined. Examples of a few are set forth below.

TechWatch Personality (e.g., for Market Research). A meta-document with a technology watch personality might include the following document service requests: identify products in itself (via Inxight ThingFinder); identify company names, individual names; build an organization chart; build a company chart; try to find a company home-page for itself; try to find competitors; find tutorials about concepts; find white papers; access stock history of company names; find out who they are hiring; find press releases and business reports; find conferences in which the concepts in the document are talked about; research patents owned by people and companies above; find the home office address, branch offices; get map to company; build patent database around concepts in document; build up URLs mentioning company, product; identify other products offered by the company; get weather reports for home office; and check whether names are registered or available for web site.

Scientific Personality. A meta-document with a scientific personality might include the following document service requests: identify concepts; identify central subject domain; produce summaries (quantitative, undirected, directed); find online versions of itself; isolate its bibliography; find home pages of all the authors; find home pages of all cited authors; find online versions of cited papers; find tutorials about concepts; find conferences in which the concepts in the document are talked about; research patents on topic; find/create BibTex version of citation; find other papers written by authors together, separately; find papers with related concepts by other authors; publish paper on various websites (such as ISI Index, Yahoo); advertise the paper in a community (such as KnowledgePump, newsgroup).

Patent Attorney Personality. A meta-document with a patent attorney personality might include the following document service requests: find other patents by same inventors; find other patents with same International Patent Code; find all patents which reference this one; identify concepts from description; identify concepts from claims; find other patents with same concepts; find home pages of all the inventors; find home pages of Assignee; find any references to published papers by the inventors; try to identify any products associated with assignee, inventors, and concepts; find other papers written by authors together, separately; find papers that might be prior art.

Fiction Reader Personality. A meta-document with a fiction reader personality might include the following document service requests; identify character names; link character names to appearances in book; find place names; find time period; link place names to maps on the WWW; link place names to photos; find street names; map street names.

Trial Lawyer Personality. A meta-document with a trial lawyer personality might include the following document service requests: identify people; find place names; build time line; associate events to timeline; find street names; map street names.

Various architectures may be used to implement a meta-document system. Such an architecture may include support for complex coordinated services, dynamic add/update/delete services, multiple distributed access, and visualization of results in a intuitive form. Several meta-document systems have been implemented.

Example: A Simple Document Soul System with a Generic Personality. In this example, a meta-document has been created by taking a regular text document and applying a generic personality. The original text is set forth below:

"Copier maker Xerox Corp. is forming an Internet-related business unit that eventually could be spun off into a separate company. The Stamford, Conn.-based company said the new Internet Business Group, disclosed Thursday, will be headed by Michael Miron, its business development chief. Xerox said the unit will seek outside venture capital and partnerships."

The first step taken by this version of the system is to isolate the original document inside INNATE tags, and to associate a generic personality with the document and the package of associated services:

<INNATE> Copier maker Xerox Corp. is forming an Internet-related business unit that eventually could be spun off into a separate company. The Stamford, Conn.-based company said the new Internet Business Group, disclosed Thursday, will be headed by Michael Miron, its business development chief. Xerox said the unit will seek outside venture capital and partnerships.

```
    </INNATE>
    <PERSONALITY> generic </PERSONALITY>
    <!SERVICE NAME, StartTime, MaxFinishTime, EndTime
SERVICE>
    <SERVICE> NAME="FindConcepts", 10:49:24 01/06/00, 10:49:24
01/08/00, "Started" </SERVICE>
    <SERVICE> NAME="FindNames", 10:49:24 01/06/00, 10:49:24
01/08/00, "Started" </SERVICE>
    <SERVICE> NAME="FindLinksConcept", 10:49:24 01/06/00,
10:49:24 01/08/00, "Started" </SERVICE>
    <SERVICE> NAME="DetermineLanguage", 0:49:24 01/06/00,
10:49:24 01/08/00, "Started" </SERVICE>
    <SERVICE> NAME="GenerateSummary", 10:49:24 01/06/00,
10:49:24 01/08/00, "Started" </SERVICE>
    <SERVICE> NAME="GetStockTrends", 10:49:24 01/06/00,
10:49:24 01/08/00, "Started" </SERVICE>
    ......
    Etc...
```

After a number of requests such as FindConcepts, FindOrganisations etc. are satisfied (or partially satisfied), we have the following marked-up document:

<INNATE> Copier maker Xerox Corp. is forming an Internet-related business unit that eventually could be spun off into a separate company. The Stamford, Conn.-based company said the new Internet Business Group, disclosed Thursday, will be headed by Michael Miron, its business development chief. Xerox said the unit will seek outside venture capital and partnerships.

```
</INNATE>
<PERSONALITY> generic </PERSONALITY>
<SERVICE> NAME="FindConcepts", 10:49:24 01/06/00, 10:49:24 01/08/00,
10:50:04 01/06/00</SERVICE>
<SERVICE> NAME="FindNames", 10:49:24 01/06/00, 10:49:24 01/08/00, 10:50:01
01/06/00 </SERVICE>
<SERVICE> NAME="FindLinksConcept", 10:49:24 01/06/00, 10:49:24 01/08/00,
"Started" </SERVICE>
<SERVICE>NAME="DetermineLanguage", 10:49:24 01/06/00, 10:49:24
01/08/00,10:50:01 01/06/00
        </SERVICE>
<SERVICE> NAME="GenerateSummary", 10:49:24 01/06/00, 10:49:24 01/08/00,
"Started" </SERVICE>
<SERVICE> NAME="FindOrganisations", 10:49:24 01/06/00, 10:49:24 01/08/00,
"Started" </SERVICE>
<SERVICE> NAME="GetStockTrends", 10:49:24 01/06/00, 10:49:24 01/08/00,
"Started" </SERVICE>
<LANGUAGE>English </LANGUAGE>
<CONCEPT>venture capital </CONCEPT>
<CONCEPT>unit </CONCEPT>
<CONCEPT>Stamford </CONCEPT>
<CONCEPT>recent earnings trouble </CONCEPT>
<CONCEPT>partnerships </CONCEPT>
<CONCEPT>Internet-related business unit </CONCEPT>
<CONCEPT>Etc........ </CONCEPT>
<ORG-KNOWN> new Internet Business Group </ORG-KNOWN>
<ORG-KNOWN> Xerox Corp. </ORG-KNOWN>
......
Etc...
<CONNECTION> QUERY= "(venture+capital)+NEAR+(Xerox+Corp.)", AltaVista,
CONNECTION_LIST=[http://www.scribe.fool.com/EveningNews/1998/EveningNews
980617.htm,
   http://foolwest.fool.com/EveningNews/1998/EveningNews980921.htm,
   http://search.fool.com/EveningNews/1998/EveningNews980921.htm,
   http://foolwest.fool.com/EveningNews/1998/EveningNews980617.htm]
</CONNECTION>
Etc...
<STOCK_PRICES> COMPANY="Xerox Corp",
         QUERY= "http://qs.cnnfn.com/tq/stockquote?symbols=xrx",
         VALUE=23.5, DATE=01/06/00
</STOCK_PRICEs>
```

Example. CLF-based Document Souls System. The document souls system may be implemented using the Coordination Language Facility (CLF), an object-based distributed application development tool. An overview of CLF is included in the Appendix A "Overview of CLF". CLF realizes most of the services outlined above for the generic document personality. CLF may also include the following additional services:

Document transformations, i.e., services related to transforming the document content (possibly qualified by user profile, work context etc.) to: noun-phrases, names, summary, language of the document.

Content connections based on noun-phrases, names etc., i.e., find conference/journal papers using for example, Calliope, find groups, people working this area, find web resources using a search engine, find tutorials, find patents, View components such as hyperlinked document concepts with found web resources Knowledge Visualiser that creates different views of the document: a readers view—that displays the document where various names, noun-phrases are hyperlinked to various sites that are related to those concepts (as determined by the search engine and the Calliope online bibliographic service); a detailed view that shows all the document content and marked up metadata related to services and their results; an writer's view that allows the writer of document do text editing.

Security—user access (administration): allows the creation of new users and corresponding keyword profiles. Also tracks user documents etc.

Network availability of documents via HTTP protocol: The system is HTTP compliant, thereby allowing users to login, create, modify, track documents and their souls from anyway in the world.

Figure 3:
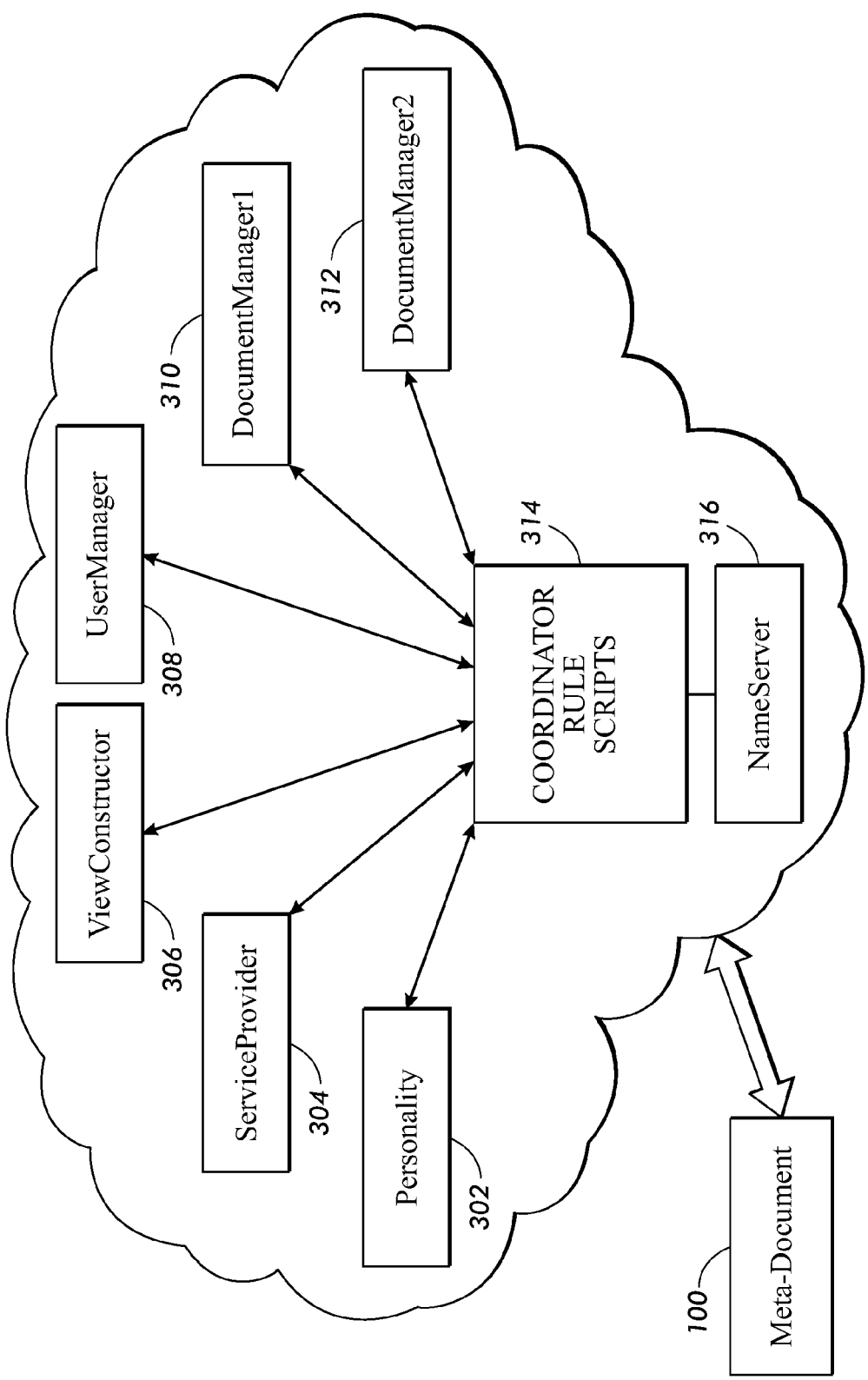
FIG. 3 is a diagram of a system according to the invention.

The main objects (participants) in the CLF implement system and their main role in the system are listed as follows and shown in FIG. 3. Note in the following services refers to CLF services, which are logical groupings of object attributes into predicates:

Personality 302 provides repositories of services that the user can select in order to specify the personality or refine an already defined personality and uses CLF services like DocService(PersonalityID, docService, order), and various CLF Rules. UserManager 308 tracks the users and their documents in the system and use a CLF services such as user(UserId, Password, DocumentID) and various CLF Rules. DocumentsMgr 310 and 312 manage documents with same personality using various banks and CLF rules document (id, content), personality(id, personality), version(id, versionNumber), creator (id, creator), ServiceData(id, action, state, data), ServiceDetails(id, when, state, LatestDateOfCompletion). Service Provider 304 realizes services for a meta-document 100, e.g., generate summary, Build DocuMap, getConcepts, getConceptWebLinks etc., CommandWrapper (Content, data): a CLF service for wrapping legacy software such as MLTT noun-phrase extractor, AltaVista, Calliope etc., YellowPages(DocumentService, provider): tracks the list of document service requests and possible providers of services. ViewConstructor 306 creates different views of the document using its data (content, meta-data etc.).

The above listed services (i.e., personality services) are realized as high level CLF IF-THEN rules such as the following:

```
IF `Document(documentName, Creator) AND
    `GenericPersonality(documentName, StartTime, MustFinish,
    EndTime) AND
    printRes(documentName,"IntrospectionDetails", StartTime,
    "AFTER",res)
THEN
    StartWant(documentName, "inProgress", 'Concept',
StartTime,MustFinish, 'notFinishedYet')
    StartWant(documentName, "inProgress", 'Name',
StartTime,MustFinish, 'notFinishedYet')
    StartWant(documentName, "inProgress", 'Summary',
StartTime,MustFinish, 'notFinishedYet')
    StartWant(documentName, "inProgress", 'Language',
StartTime,MustFinish, 'notFinishedYet')
    Etc...
```

This rule monitors the availability of meta-documents in the system that have an associated personality "GenericPersonality". Once a document meeting these criteria is detected various documents services are launched with various time constraints. The Coordinator object 314 coordinates the document service requests realized by rules using traditional two-phase/commit protocol of transaction systems.

Meta-documents or document souls can be expressed within a document format as XML that marks up the document with tags describing the document requests/services, their results, and their status (whether satisfied, unsatisfied, or renewable) and possibly the code to realize those services (e.g., CLF IF-THEN rules). While XML is well suited for storing and transporting documents across different systems, it is a costly format for processing documents. The World Wide Web Consortium, W3C, is currently defining a set of interfaces for structured documents, called the Document Object Model, DOM, which may be used to represent meta-documents in a meta-document system. The DOM represents XML documents as trees of nodes, each node representing an XML element. Furthermore it defines a standard set of operations for navigation and modification of the document structure and contents.

Figure 4:
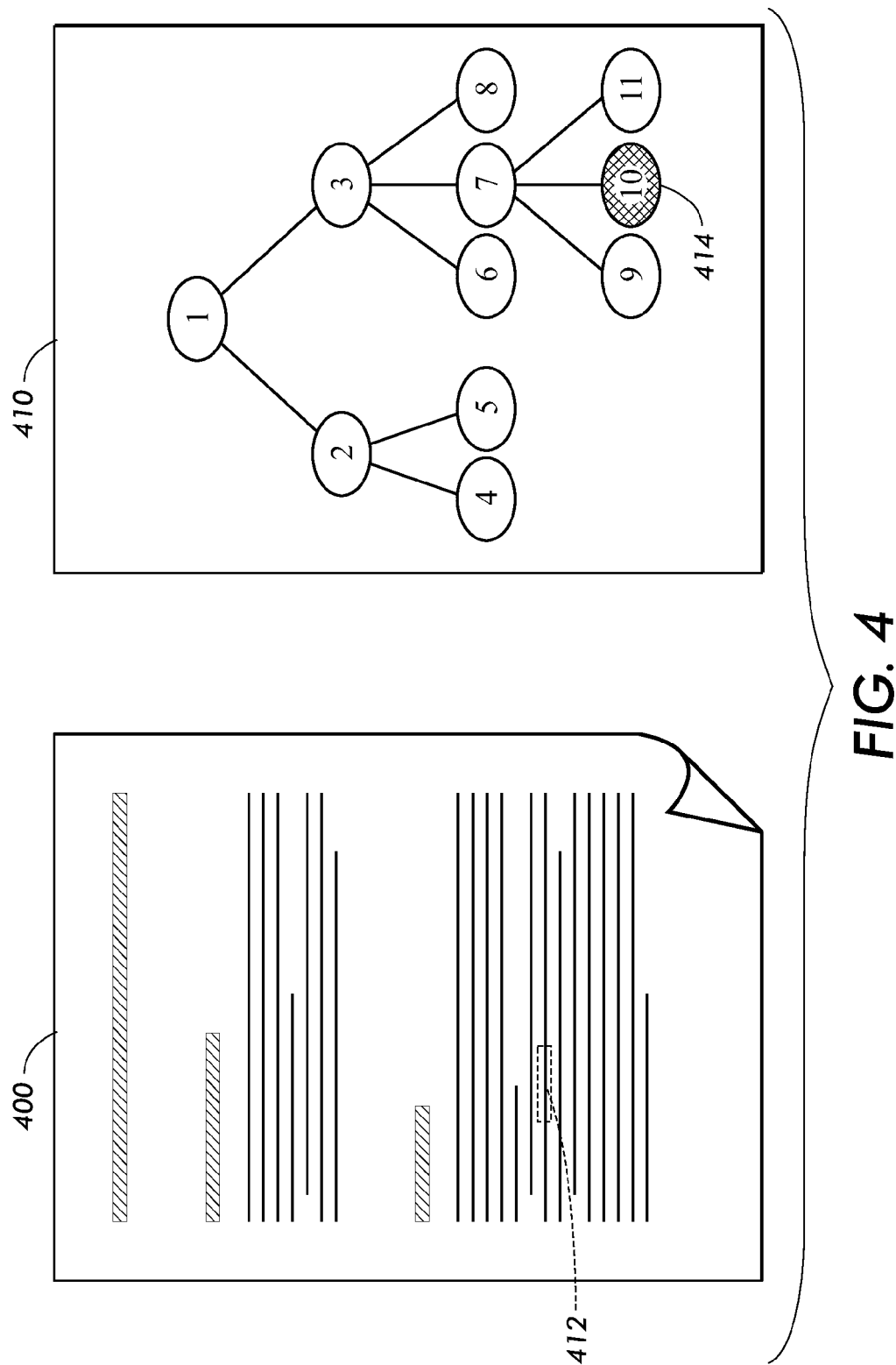
FIG. 4 is a diagram of a meta-document and its corresponding representation as a DOM tree.

A meta-document exposes its document service requests through specific nodes in the DOM tree, and DOM operations allow the document's contents and metadata to be queried and modified through a programmatic interface. FIG. 4 shows a document 400 and its representation in the form of a DOM tree 410. Node 1 represents the root of the document, node 2 the first section, node 4 the first paragraph of the first section, etc. The document request inserted into the second paragraph of the second section, and indicated in bold 412 in the document (although it may in fact be invisible to the reader of the document) is represented by node 10 (414) in the DOM tree.

The basic mapping function between the DOM and XML representations of documents is trivial: any node in a DOM tree is represented by an XML-start tag, followed by the "contents" of the node, followed by the corresponding XML-end tag. This mapping function is then applied recursively, in the case where the contents of a node is a set of child nodes. Parsers (to transform the textual XML representation of a document into a DOM tree) and various interpreters such as pretty-printers (to transform DOM trees into XML strings or into any other more human readable form) are available from many different sources.

When a new request is inserted into a document, either by the author or as the result of the processing of some other request, a corresponding request node is inserted into the DOM tree. Request nodes represent tags in the document, in that they are not part of the visible content of the document. Both XML and DOM treats meta-data and content-data in exactly the same way. In XML any element, be it visible content or meta-data, is represented by a start tag (with optional attributes), contents and end-tag. The same is true for the DOM where elements are represented by nodes. It is in fact the print function that decides what is visible or not to the reader of a document.

In its simplest form, using DOM, the meta-document system may be implemented using a "Document Souls Demon" or scheduler to manipulate each document through its DOM interface. The Document Souls Demon would scan the DOM structure, detect unsatisfied requests, choose the next request to work on, find a service that could satisfy the request, invoke that service and retrieve the results, insert the result into the DOM structure, and re-iterate for the next request. Given that the response time for a particular request could be high—in particular if it involves searching for information over the Internet—a better approach is to let as many unsatisfied requests as possible be active at the same time, and allow the endowed document to be able to react to any new information as soon as that information is available.

A complication arises when there are dependencies between requests. Consider for example a meta-document with a Tech watch personality. It could contain requests for collecting, for example, press releases from all companies mentioned in the document. However, it could also contain a request to remove all mentioned companies with a turn-over less than 20 million dollars. If these requests are processed asynchronously and at the same time, we risk ending up with press releases from companies not mentioned in the document. In order to cope with this, the concept of coordination from the area of coordinated software systems may be used.

A coordinated software system consists of a set of autonomous sub-systems and a set of rules that describes how the system should react to changes either in its environment or in the state of any of its sub-systems. The sub-systems are typically used in several systems at the same time, and each system is defined in terms of its coordination rule set. Sub-systems and rule set coordinators are designed so as to handle dependencies between ongoing processing, such as in the example above. A coordinated systems approach is a very powerful means to build new systems from available parts, in particular in situations where the sub-systems are unknown to each other, such as is the case with many publicly available services intended for use with the meta-document system. The coordination model of Document Souls follows the model of the XRCE Coordination Language Facility, CLF.

In Document Souls, both document service requests and the meta-documents (possibly represented as DOM trees) are considered as autonomous sub-systems. The Document Souls Coordinator 314 contains rules that describe how different requests present in endowed documents could be satisfied through the invocation of various services, how to resolve issues of competing (and possibly conflicting) results from services, and how results finally are to be merged back into the documents.

The Coordinator 314 immediately reacts to new information and situations. For example, a meta-document may have requested the insertion of a link to the information page of a new product, but an information page may not yet be available when the request is first activated. In this case the Coordinator will keep the request active and immediately react when the information page is detected.

The meta-document system provides three elements of a knowledge thrust engagement plan: content, and community. The personality given a document anticipates in which context that a document will be used. The document service requests launched by this personality analyze and exploit the content of the document. And the linking of this content with local databases and the Web creates the community around the document.

Appendix A: Overview of CLF

The Coordination Language Facility (CLF), an object-based distributed application development tool, has been developed within the Coordination Technologies Group at XRCE (Xerox Research Center, Grenoble). CLF assumes an object model of autonomous agents that can engage in interactions more sophisticated than those in the traditional object paradigm. Traditionally, the object-oriented paradigm has provided direct interaction with object attributes/resources via accessors/mutators methods (encapsulation principle). This paradigm though very useful and successful, has limitations when programming in very large distributed environments such as the internet, which calls for more sophisticated object interaction primitives than those provided by the traditional object model. In order to address this requirement, various object interoperation/coordination models have been proposed and developed. CLF is an example of such a model. Within the CLF framework access to objects and their attribute values is not only provided via direct access methods (traditional access/mutate), but also through associative access (i.e., through pattern matching).

In the CLF paradigm, agents are seen as resource managers that accept two types of operations: insertion and removal of resources. The underlying architecture is client-server, where the client objects (which could be objects or rules see below) attempts to insert/remove resources into a server object. The resources managed by a CLF object (server) can be accessed via traditional, publicly available access/mutate methods or via the CLF protocol. The CLF protocol offers associative access to resources through predicates. A predicate is characterized by a predicate name and a tuple of arguments may or may not be instantiated. Predicates can be seen as natural groupings of attribute values. For example, consider the predicate ConceptLink that is published by a server object. This predicate groups information related to WWW links to a concept (noun-phrase) that is present in a document. The predicate signature could look like this ConceptLink(Concept, Document_ID, WWWLink, ProviderOfLink), where ConceptLink is the predicate name, Concept is the noun-phrase present in the document identified by Document_ID, WWWLink denotes the WWW address to site that is deemed relevant for Concept, ProviderOfLink is the name of the service provider that identified the link (e.g. such as Alta Vista or Yahoo). Links to a concept such as "Fuzzy Logic" in a document entitled "InterestingThings", could be retrieved via the following pattern, where Concept is instantiated to "Fuzzy Logic" and Document_ID is instantiated to "InterestingThings": ConceptLink("Fuzzy Logic", Document_ID, WWWLink, ProviderOfLink).

In CLF terminology, the public predicates of an object are termed the services of an object. These are listed in the interface of the object. In practice, services delegate data management to resource managers. Resource managers, along with providing a level of abstraction that insulates the services from the data model (i.e. data model could be a file, a database management system, a call to an external service such as WWW-based search engine or other legacy systems) also supports the CLF protocol. In other words resource managers provides access to resources (grouped attribute values) owned by a server object and allows clients to manipulate them through the CLF protocol operations (outlined below). Within the current realization of CLF various resource managers are provided that can be used directly or further specialized/refined (i.e. resource managers are classes that can be used directly or further subclassed in order change behaviors etc.) in an application. Alternatively one can build resource managers from scratch.

The CLF protocol provides of a set of operations that allow a client to insert or remove resources accessed associatively on a server object. This protocol supports the traditional two-phase/commit protocol of transaction systems. The operations currently supported under the CLF protocol are as follows: Insert, Inquire, Next, Kill, Check, Reserve, and Confirm/Cancel. The Insert operation permits the client to insert a predicate and a fully instantiated tuple of arguments into the server object (i.e. produce a resource). The Inquire operation allows the client to query a server object as to the availability of a resource(s) that satisfy a predicate and corresponding instantiated or uninstantiated arguments. The Inquire operation returns a stream of action ids (or privileges to remove or consume corresponding resources). During the transactional phase the client Reserves an action id. If the server accepts the reservation, the offer becomes a contract binding the server to remove the resource (i.e., client consumes the resource) on demand. The client may then send a Confirm to the server whereby the client consumes the resource and the server deletes the resource. Alternatively, the client can send a Cancel operation whereby the reserved resource is returned to its initial unreserved state. The Next operation allows the client to retrieve the next action id in the stream returned by the Inquire operation.

Typical resource managers available in CLF include File, TupleSpace, Database Management Systems (DBMS) etc. Various refinements of these base classes of resource mangers are currently available under CLF such as persistency. Application specific resource managers can easily be defined from scratch or derived from existing classes.

In order to coordinate behaviors between objects within the CLF framework, a high-level IF-THEN rule-based coordination language facility is provided. This language builds on the high-level predicates made available through object interfaces, allowing the user to express complex coordinated activities in a transaction-based way. IF-THEN rules in CLF consist of a left-hand side and right-hand side; the LHS consists of a list of predicates (with instantiated or uninstantiated variables) corresponding to resources that are consumed and the RHS consists of a list of predicates (with instantiated variables) corresponding to resources that will inserted into an server object. Rules are said to fire if all the LHS predicates have been satisfied and consequently insert the instantiated predicate in the form of a resource into the corresponding object. The following is an example of CLF rule that could be used to alert the owner of document that all the desired services for a document have been completed:

---

IF allServicesCompleted(Doc_ID) and 'docOwner(Doc, Owner) and 'userDetails(Owner, _, _, Email) THEN email(Email,
"Hey" + Owner + "All services for" + Doc_ID +
"have completed")

---

Here the predicates on the left and right hand side of the rules are merely shorthand interfaces to the services made publicly available by objects in the system. These interfaces could be defined as follows (in a simplified version of the CLF scripting language):

```
AllServicesCompleted(Doc_ID): DocumentManager.
AllServicesCompleted(Doc_ID)
    docOwner(Doc_ID, Owner): UsertManager. GetDocOwner
    (Doc_ID, Owner)
    userDetails(User, ID, Location, Email): UsertManager.
GetDocOwner (User, ID, Location, Email)
    email(Email, Message): UsertManager.SendEmail(Email, Message)
```

The predicate AllServicesCompleted denotes a unary property of resources owned by the DocumentManager object and made publicly available by AllServicesCompleted service. The object names referred in these signatures/interfaces are global names resolved by the name server object which is generated at system startup. All objects register with the name server object at creation time. The parameters associated with the document service requests correspond to input and output parameters, where input parameters are denoted by plain text and the output parameters are denoted by underline text. When the CLF inference tries to satisfy the first condition (predicate allServicesCompleted) of this rule it issues an Inquire operation to the AllServicesCompleted service of the DocumentManager object. In this case Doc_ID is a free variable (i.e., uninstantiated) that will be instantiated with each execution the Next operation. If the AllServicesCompleted predicated is suitably satisfied, then the inference engine will search for appropriate instantiations of the predicates on the left hand side of this rule. The SendEmail service in UsertManager object is an example of a wrapper service which wraps and an emailer (this could be realized simply as a call to the operating system). Once the email resource is inserted, the email is sent to the owner of the document.

In short the rule will try to accomplish the following:

Find a resources that consisting the predicates AllServicesCompleted, docOwner, and userDetails. In the case of AllServicesCompleted, the resource is consumed (i.e., deleted from the object), whereas in case of both docOwner and userDetails the resources are merely consulted (i.e., not consumed).

Once all the left hand side predicates have been suitably instantiated the rule fires and inserts an email resource with the corresponding instantiations Email and Owner and Doc_ID. In CLF, rules are resources that are inserted into objects know as Coordinators object (several coordinators may exist). Coordinators perform coordination between arbitrary CLF objects.

CLF is a good architecture for a meta-document system in that it is distributed, it employs dynamic definitions (dynamic add/delete objects and their behaviors). It has HTTP Interaction. CLF also provides a nice, natural separation between Actions-Data-DataManagement. Transactions in CLF can coordinate behaviors across networks easily, it is a reactive system.

Appendix B

A sample meta-document is shown at various stages of its changes as document service requests are implemented and results integrated into the meta-document.

Step 0: Original Document

[Image]
Comparisonics is a revolutionary technology for
searching audio and video by sound,
and for visualizing audio by
coloring the audio waveform display.
))) (((
Tell me how Comparisonics is revolutionary in
Audio Editing
Video Editing
Media Asset Management
Other Applications
))) (((
How can I try out Comparisonics?
Download the free Comparisonics Audio Player.
How can application programs use Comparisonics?
Through the Comparisonics API.
Tell me about Comparisonics Corporation.
))) (((
The Comparisonics technology was debuted at the National Association
of Broadcasters (NAB) convention in April 1998, and was selected as a
Pick of the Show by the editors of Television Broadcast magazine.
))) (((
An ability to locate the sound you want in a database of such sounds, is
clearly of far-reaching economic value. The Comparisonics breakthroughs
in this area are fun to play with and, more seriously, of very great potential
commercial value.
- Dr. Harry M. Markowitz, Nobel laureate in Economics and Computer
Science pioneer, January 1999
))) (((
[Image]
Comparisonics Waveform Display
of a Segment from Kenny G's Songbird
))) (((
Copyright © 1999 Comparisonics Corporation. All rights reserved.

Step 1: convert original document into a meta-document, in this case by giving it a personality. The personality will be activated by a Service Provider (either a default provider that is accessed by the Document Souls demon that schedules Living Documents, or by a provider specified somehow by the document owner).

<?xml version="1.0" encoding="UTF-8" standalone="yes"?>
<PERSONALITY type="TechWatch" status="newbore">
<INNATE>
[Image]
Comparisonics is a revolutionary technology for
searching audio and video by sound,
and for visualizing audio by
coloring the audio waveform display.
))) (((
Tell me how Comparisonics is revolutionary in
Audio Editing
Video Editing
Media Asset Management
Other Applications
))) (((
How can I try out Comparisonics?
Download the free Comparisonics Audio Player.
How can application programs use Comparisonics?
Through the Comparisonics API.
Tell me about Comparisonics Corporation.
))) (((
The Comparisonics technology was debuted at the National Association of
Broadcasters (NAB) convention in April 1998, and was selected as a Pick
of the Show by the editors of Television Broadcast magazine.
))) (((
An ability to locate the sound you want in a database of such sounds, is
clearly of far-reaching economic value. The Comparisonics
breakthroughs in this area are fun to play with and, more seriously, of
very great potential commercial value.
- Dr. Harry M. Markowitz, Nobel laureate in Economics and
Computer Science pioneer, January 1999

```
                    ))) (((
                   [Image]
           Comparisonics Waveform Display
          of a Segment from Kenny G's Songbird
                    ))) (((
    Copyright © 1999 Comparisonics Corporation. All rights reserved.
                  </INNATE>
                </PERSONALITY>
```

Step 2: Here the personality service has instantiated the document service requests associated with a TechWatch personality. Document service requests would be run over the document synchronously or asynchronously, in-order, or out-of-order. In "step2.xml" the 'document service requests' (supplied by the Personality Server) are all independent, but one would probably define some document service requests as an ordered sequence of actions.

```
    <?xml version="1.0" encoding="UTF-8" standalone="yes"?>
        <PERSONALITY type="TechWatch">
            <UNFULFILLED-ACTION-LIST>
                <WANT> identify products </WANT>
                <WANT> identify companies </WANT>
                <WANT> build orgchart </WANT>
                <WANT> find company homepage </WANT>
                <WANT> find competitors </WANT>
                <WANT> find tutorials </WANT>
                <WANT> find whitepapers </WANT>
                <WANT> stock quotes </WANT>
                <WANT> job opportunities </WANT>
                <WANT> press releases </WANT>
                <WANT> related conferences </WANT>
                <WANT> patents owned </WANT>
                <WANT> company map </WANT>
                <WANT> company address </WANT>
         <WANT> non-company URLS mentioning company </WANT>
                <WANT> weather-report home office </WANT>
                <WANT> other products offered </WANT>
            </UNFULFILLED-ACTION-LIST>
            <INNATE>
                [Image]
         Comparisonics is a revolutionary technology for
              searching audio and video by sound,
                and for visualizing audio by
              coloring the audio waveform display.
                    ))) (((
         Tell me how Comparisonics is revolutionary in
                     Audio Editing
                     Video Editing
                  Media Asset Management
                    Other Applications
                    ))) (((
              How can I try out Comparisonics?
         Download the free Comparisonics Audio Player.
        How can application programs use Comparisonics?
                Through the Comparisonics API.
             Tell me about Comparisonics Corporation.
                    ))) (((
   The Comparisonics technology was debuted at the National Association of
    Broadcasters (NAB) convention in April 1998, and was selected as a
        Pick of the Show by the editors of Television Broadcast magazine.
                    ))) (((
   An ability to locate the sound you want in a database of such sounds, is
          clearly of far-reaching economic value. The Comparisonics
      breakthroughs in this area are fun to play with and, more seriously, of
                very great potential commercial value.
          - Dr. Harry M. Markowitz, Nobel laureate in Economics and
                Computer Science pioneer, January 1999
                    ))) (((
                   [Image]
           Comparisonics Waveform Display
          of a Segment from Kenny G's Songbird
                    ))) (((
    Copyright © 1999 Comparisonics Corporation. All rights reserved.
```

```
                  </INNATE>
                </PERSONALITY>
```

Step 3: Here one of the WANTs (document service requests) "company address" has been fulfilled. Metadata has been created. This document service request was fulfilled by some Document Soul demon that:

1. gained control of the document,
2. picked, according to some undisclosed strategy, one of the document service requests from the action list,
3. called some unspecified Service Provider that could satisfy a "company address" service for a "TechWatch" document, passing to this service existing metadata and the <INNATE> . . . </INNATE> part of the document,
4. received the results <COMPANYADDRESS> . . . </COMPANYADDRESS> from the service
5. deleted <WANT> company address </WANT> from the unfulfilled action list
6. timestamped the <SATISFIED-WANT> entry and inserted this into the fulfilled action list
7. rewrote the document (possibly using version control) and
8. relinquished possession of the document The Service Provider could have been an in-house program that searches and decodes web pages. It could be an outsourced, or even human service, that returns the required metadata.

```
    <?xml version="1.0" encoding="UTF-8" standalone="yes"?>
        <PERSONALITY type="TechWatch">
            <UNFULFILLED-ACTION-LIST>
                <WANT> identify products </WANT>
                <WANT> identify companies </WANT>
                <WANT> build orgchart </WANT>
                <WANT> find company homepage </WANT>
                <WANT> find competitors </WANT>
                <WANT> find tutorials </WANT>
                <WANT> find whitepapers </WANT>
                <WANT> stock quotes </WANT>
                <WANT> job opportunities </WANT>
                <WANT> press releases </WANT>
                <WANT> related conferences </WANT>
                <WANT> patents owned </WANT>
                <WANT> company map </WANT>
         <WANT> non-company URLS mentioning company </WANT>
                <WANT> weather-report home office </WANT>
                <WANT> other products offered </WANT>
            </UNFULFILLED-ACTION-LIST>
            <FULFILLED-ACTION-LIST>
       <SATISFIED-WANT time="1999/10/23 19:10"> company address
                </SATISFIED-WANT>
            </FULFILLED-ACTION-LIST>
            <COMPANYADDRESS>
             <NAME> Comparisonics Corporation </NAME>
                <STREET> P.O. Box 1960 </STREET>
                <CITY> Grass Valley </CITY>
                <STATE> California </STATE>
                <ZIP> 95945 </ZIP>
                <COUNTRY> USA </COUNTRY>
             <EMAIL> info@comparisonics.com </EMAIL>
            </COMPANYADDRESS>
            <INNATE>
                [Image]
         Comparisonics is a revolutionary technology for
              searching audio and video by sound,
                and for visualizing audio by
              coloring the audio waveform display.
                    ))) (((
         Tell me how Comparisonics is revolutionary in
                     Audio Editing
```

Video Editing
Media Asset Management
Other Applications
))) (((
How can I try out Comparisonics?
Download the free Comparisonics Audio Player.
How can application programs use Comparisonics?
Through the Comparisonics API.
Tell me about Comparisonics Corporation.
))) (((
The Comparisonics technology was debuted at the National Association of Broadcasters (NAB) convention in April 1998, and was selected as a Pick of the Show by the editors of Television Broadcast magazine.
))) (((
An ability to locate the sound you want in a database of such sounds, is clearly of far-reaching economic value. The Comparisonics breakthroughs in this area are fun to play with and, more seriously, of very great potential commercial value.
- Dr. Harry M. Markowitz, Nobel laureate in Economics and Computer Science pioneer, January 1999
))) (((
[Image]
Comparisonics Waveform Display
of a Segment from Kenny G's Songbird
))) (((
Copyright © 1999 Comparisonics Corporation. All rights reserved.
</INNATE>
</PERSONALITY>

Step 4: Shows a few other actions satisfied, and some new "WANTs". For example, the "find orgchart" server found a president, CEO and parent company but no junior officers. This service requested a new service "find junior officers".

```
<?xml version="1.0" encoding="UTF-8" standalone="yes"?>
<PERSONALITY type="TechWatch">
<UNFULFILLED-ACTION-LIST>
<WANT> identify products </WANT>
<WANT> identify companies </WANT>
<WANT> find company homepage </WANT>
<WANT> find competitors </WANT>
<WANT> find tutorials </WANT>
<WANT> find whitepapers </WANT>
<WANT> stock quotes </WANT>
<WANT> job opportunities </WANT>
<WANT> related conferences </WANT>
<WANT> company map </WANT>
<WANT> non-company URLS mentioning company </WANT>
<WANT> weather-report home office </WANT>
<WANT> other products offered </WANT>
<WANT> find junior officers </WANT>
</UNFULFILLED-ACTION-LIST>
<FULFILLED-ACTION-LIST>
<SATISFIED-WANT time="1999/10/23 19:10"> company address </SATISFIED-WANT>
<SATISFIED-WANT time="1999/10/24 00:10"> find whitepapers </SATISFIED-WANT>
<SATISFIED-WANT time="1999/10/23 23:11"> patents owned </SATISFIED-WANT>
<SATISFIED-WANT time="1999/10/23 22:16"> find whitepapers </SATISFIED-WANT>
<SATISFIED-WANT time="1999/10/25 00:41"> find press releases </SATISFIED-WANT>
</FULFILLED-ACTION-LIST>
<COMPANYADDRESS>
<NAME> Comparisonics Corporation </NAME>
<STREET> P.O. Box 1960 </STREET>
<CITY> Grass Valley </CITY>
<STATE> California </STATE>
<ZIP> 95945 </ZIP>
<COUNTRY> USA </COUNTRY>
<EMAIL> info@comparisonics.com </EMAIL>
</COMPANYADDRESS>
<ORGCHART>
<PARENT-ORG> <a href="http://www.gpsys.com"> Graham-Patten Systems </a>
</PARENT-ORG>
<CEO> <a href="http://www.isri.unlv.edu/~rice/"> Dr. Stephen V. Rice </a> </CEO>
<PRESIDENT> Dr. Stephen V. Rice </PRESIDENT>
</ORGCHART>
<WHITEPAPER>
<a href="http://www.comparisonics.com/WhitePaper.html"> Comparisonics White Paper </a>
</WHITEPAPER>
<PRESS_RELEASES>
<RELEASE> <TITLE> Graham-Patten Launches Comparisonics Sound Matching Software </TITLE>
<TEXT> <a href="http://www.gpsys.com/pr0406984.html"> Text </a> </TEXT>
<DATE> 6 Apr 1998 </DATE>
</RELEASE>
</PRESS-RELEASES>
<PATENTS>
<PATENT> <NUMBER> US4686689 </NUMBER>
<TITLE> Phase-locked loop circuit </TITLE>
<TEXT> <a href="http://www.patents.ibm.com/details?pn=US04686689__"> Text </a>
</TEXT>
<DATE> Aug 11, 1987 </DATE>
```

```
                                </PATENT>
                               </PATENTS>
                                <INNATE>
                                 [Image]
                Comparisonics is a revolutionary technology for
                      searching audio and video by sound,
                         and for visualizing audio by
                        coloring the audio waveform display.
                                   ))) (((
                  Tell me how Comparisonics is revolutionary in
                                Audio Editing
                                Video Editing
                            Media Asset Management
                              Other Applications
                                   ))) (((
                       How can I try out Comparisonics?
                   Download the free Comparisonics Audio Player.
                   How can application programs use Comparisonics?
                          Through the Comparisonics API.
                     Tell me about Comparisonics Corporation.
                                   ))) (((
             The Comparisonics technology was debuted at the National Association of
             Broadcasters (NAB) convention in April 1998, and was selected as a Pick of
                    the Show by the editors of Television Broadcast magazine.
                                   ))) (((
              An ability to locate the sound you want in a database of such sounds, is
             clearly of far-reaching economic value. The Comparisonics breakthroughs in
                this area are fun to play with and, more seriously, of very great potential
                                commercial value.
             - Dr. Harry M. Markowitz, Nobel laureate in Economics and Computer Science
                                pioneer, January 1999
                                   ))) (((
                                 [Image]
                         Comparisonics Waveform Display
                       of a Segment from Kenny G's Songbird
                                   ))) (((
                Copyright © 1999 Comparisonics Corporation. All rights reserved.
                                </INNATE>
                             </PERSONALITY>
```

The invention has been described with reference to particular embodiments. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A document-based system for acquiring information pertaining to a document, comprising:
   a computer having a memory storing a meta-document including the document, the document including content information, and a set of one or more document service requests based on a personality associated with the document, wherein a personality comprises a theme or context, wherein each document service request in the set comprises a process for using a portion of the document's content information as a starting point to obtain other information from a service provider pertaining to the document's content information, wherein associating a set of one or more document service requests based on a different personality to the document's content information will provide different results; and
   a scheduler for autonomously activating and managing the document service requests without user intervention by periodically polling the meta-document for document service requests, for selecting a document service request from the set of one or more document service requests, for initiating and managing communication with a selected service provider to satisfy the selected document service request and for integrating any results from the selected document service request into the meta-document, wherein the meta-document includes the document, the set of one or more document service requests and integrated results;
   wherein the set of one or more document service requests follow a sequence of calls to service providers for extracting information from one or more of other documents, databases and data stores, and for searching for other information responsive to any extracted information from the one or more of other documents, databases and data stores.

2. The system of claim 1, wherein the personality is one of Tech Watch, Scientific, patent Attorney, Fiction Reader, Trial Lawyer, Generic.

3. The system of claim 1, wherein the results from the selected document service request include a new document service request associated with the document.

4. The system of claim 1, wherein the selected document service request is satisfied by a third-party service provider via an Internet protocol.

5. The system of claim 1, wherein the scheduler updates the set of one or more document service requests on a predetermined schedule.

6. The system of claim 1, wherein the scheduler re-initiates the selected document service request on a periodic basis.

7. The system of claim 6, wherein the periodic basis is determined by the selected document service request.

8. The system of claim 1, wherein the meta-document, the scheduler and the service providers reside at the same location.

9. The system of claim 1, wherein the meta-document, the scheduler and the service providers reside at different locations.

10. The system of claim 1, wherein the sequence of calls is a pre-determined sequence of calls.

11. The system of claim 1, wherein the sequence of calls to service providers are satisfiable asynchronously.

12. The system of claim 1, wherein the document and the set of one or more document service requests are user-selectable.

13. The system of claim 1, wherein, in addition to the scheduler, a user may select a document service request from the set and initiate and manage communication with a service provider to satisfy the selected document service request.

14. The system of claim 1, further comprising a list of document service requests from which the set of one or more document service requests may be selected by a user.

15. The system of claim 1, wherein the service provider is user-selectable.

16. The system of claim 14, wherein a service provider can register additional document service requests to the list.

17. The system of claim 1, further comprising a list of service providers available for satisfying document service requests.

18. The system of claim 1, wherein the set of one or more document service requests associated with the document are associated using metadata.

19. A computer implemented document-centric method for acquiring information pertaining to a document, comprising:
creating a meta-document comprising providing the document, the document including content information, associating a set of one or more document service requests based on a personality with the document, wherein a personality comprises a theme or context, wherein each document service request in the set comprises a process for using a portion of the document's content information as a starting point to obtain other information from a service provider pertaining to the document's content information, wherein associating a set of one or more document service requests based on a different personality to the document's content information will provide different results; and
autonomously activating and managing the document service requests without user intervention, comprising:
periodically polling the meta-document for document service requests;
selecting a document service request from the set;
initiating and managing communication with the service provider to satisfy the selected document service request; and
integrating any results from the selected document service request into the meta-document, wherein the meta-document includes the document, the set of one or more document service requests and integrated results;
wherein the set of one or more document service requests follow a sequence of calls to service providers for extracting information from one or more of other documents, databases and data stores, and for searching for other information responsive to any extracted information from the one or more of other documents, databases and data stores.

* * * * *